United States Patent
Fukumoto et al.

(10) Patent No.: US 10,710,296 B2
(45) Date of Patent: Jul. 14, 2020

(54) FORMATION OF THREE DIMENTIONAL OBJECTS INCLUDING MAGNETIC MATERIAL

(71) Applicant: MICROSOFT TECHNOLOGY LICENSING, LLC, Redmond, WA (US)

(72) Inventors: Masaaki Fukumoto, Beijing (CN); Masayasu Ogata, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 264 days.

(21) Appl. No.: 15/543,946

(22) PCT Filed: Jan. 16, 2015

(86) PCT No.: PCT/CN2015/070851
§ 371 (c)(1),
(2) Date: Jul. 14, 2017

(87) PCT Pub. No.: WO2016/112528
PCT Pub. Date: Jul. 21, 2016

(65) Prior Publication Data
US 2018/0022017 A1 Jan. 25, 2018

(51) Int. Cl.
*B29C 64/106* (2017.01)
*B33Y 30/00* (2015.01)
(Continued)

(52) U.S. Cl.
CPC ........ *B29C 64/106* (2017.08); *B29C 48/0013* (2019.02); *B29C 48/022* (2019.02);
(Continued)

(58) Field of Classification Search
CPC ............... B29B 1/00; H01F 1/28; B22F 3/009
(Continued)

(56) References Cited

U.S. PATENT DOCUMENTS

2004/0222561 A1 11/2004 Hopkins
2008/0157436 A1 7/2008 Patel et al.
(Continued)

FOREIGN PATENT DOCUMENTS

CN 102963002 A 3/2013
WO 2007/039450 A1 4/2007
(Continued)

OTHER PUBLICATIONS

International Search Report and Written Opinion for PCT/CN2015/070851, dated Sep. 24, 2015.
(Continued)

*Primary Examiner* — Betelhem Shewareged

(57) ABSTRACT

Implementations described herein are directed to forming objects including one or more layers of a polymeric material that include a magnetic material. The objects can be produced by forming one or more first layers that include a first polymeric material. The one or more first layers can be free of a magnetic material. Additionally, the object can be produced by forming one or more second layers that include a second polymeric material having a magnetic material. For example, the one or more second layers can include a polymeric material embedded with magnetic particles. The one or more first layers and the one or more second layers can be formed by extruding the first polymeric material and the second polymeric material onto a substrate according to a pattern. A magnetizing device can be used to magnetize the magnetic material included in the one or more second layers.

20 Claims, 6 Drawing Sheets

(51) Int. Cl.
  *B33Y 70/00*     (2020.01)
  *B29C 70/88*     (2006.01)
  *B29C 64/118*    (2017.01)
  *B29C 71/00*     (2006.01)
  *B29C 64/336*    (2017.01)
  *B29C 64/30*     (2017.01)
  *B29C 48/14*     (2019.01)
  *B29C 48/03*     (2019.01)
  *B29C 48/285*    (2019.01)
  *B29C 48/25*     (2019.01)
  *B29C 48/00*     (2019.01)
  *B29C 48/21*     (2019.01)
  *B33Y 10/00*     (2015.01)
  *B33Y 50/02*     (2015.01)
  *B33Y 80/00*     (2015.01)
  *B29C 64/209*    (2017.01)
  *B29C 64/393*    (2017.01)
  *B29K 101/12*    (2006.01)
  *B33Y 40/00*     (2020.01)
  *B29K 55/02*     (2006.01)
  *B29K 67/00*     (2006.01)
  *B29L 9/00*      (2006.01)
  *B29C 48/02*     (2019.01)

(52) U.S. Cl.
  CPC ............ *B29C 48/03* (2019.02); *B29C 48/142* (2019.02); *B29C 48/147* (2019.02); *B29C 48/21* (2019.02); *B29C 48/266* (2019.02); *B29C 48/2886* (2019.02); *B29C 64/118* (2017.08); *B29C 64/209* (2017.08); *B29C 64/30* (2017.08); *B29C 64/336* (2017.08); *B29C 64/393* (2017.08); *B29C 70/88* (2013.01); *B29C 71/0081* (2013.01); *B33Y 10/00* (2014.12); *B33Y 30/00* (2014.12); *B33Y 50/02* (2014.12); *B33Y 70/00* (2014.12); *B33Y 80/00* (2014.12); *B29C 48/02* (2019.02); *B29K 2055/02* (2013.01); *B29K 2067/046* (2013.01); *B29K 2101/12* (2013.01); *B29K 2995/0008* (2013.01); *B29L 2009/00* (2013.01); *B33Y 40/00* (2014.12)

(58) Field of Classification Search
  USPC ...................................................... 428/195.1
  See application file for complete search history.

(56) References Cited

U.S. PATENT DOCUMENTS

| | | |
|---|---|---|
| 2010/0230862 A1 | 9/2010 | Arney et al. |
| 2012/0156516 A1 | 6/2012 | Matsui et al. |
| 2015/0080495 A1* | 3/2015 | Heikkila ............... B33Y 10/00 523/223 |
| 2018/0022017 A1* | 1/2018 | Fukumoto ........... B29C 48/2886 264/464 |

FOREIGN PATENT DOCUMENTS

| | | |
|---|---|---|
| WO | 2012/060203 A1 | 5/2012 |
| WO | 2015006697 A1 | 1/2015 |

OTHER PUBLICATIONS

"Office Action Issued in European Patent Application No. 15877447. 1", dated Dec. 21, 2017, 2 Pages.
"Second Office Action and Search Report Issued in Chinese Patent Application No. 201580012010.X", dated Dec. 25, 2017, 16 Pages.
Krueger, et al., "3D Printing of Magnetorheological Elastomers (MREs) Smart Materials", In Proceedings of 1st International Conference Progress in Additive Manufacturing, May 26, 2014, 6 Pages.
"First Office Action and Search Report Issued in Chinese Patent Application No. 201580012010.X", dated Apr. 26, 2017, 12 Pages.
"Third Office Action Issued in Chinese Patent Application No. 201580012010.X", dated Jun. 12, 2018, 7 Pages.

* cited by examiner

FORMATION OF THREE DIMENTIONAL OBJECTS INCLUDING MAGNETIC MATERIAL

CROSS-REFERENCE TO RELATED APPLICATION

This application is a U.S. National Stage Application of PCT/CN2015/070851, filed Jan. 16, 2015, which application is hereby incorporated by reference. To the extent appropriate, a claim of priority is made to the above disclosed application.

BACKGROUND

Additive manufacturing is a process used to produce three-dimensional (3D) objects. Additive manufacturing can be performed by extruding a material through a nozzle and depositing (typically layer-by-layer) the material onto a substrate to form an object. In some instances, the material used to form the layers of the 3D object may be referred to herein as "build material." Extrusion-based additive manufacturing is sometimes called "Fused Deposition Modeling®" (FDM®), which is a trademark of Stratasys Ltd. Of Edina, Minn., "fused filament fabrication" (FFF), or more generally, "3D printing."

Additive manufacturing processes often utilize electronic data that represents an object, such as a computer-aided design (CAD) model of the object, to form the object. The electronic data can be processed by a computing device component of the additive manufacturing apparatus (e.g., a 3D printer) to form the object. For example, an electronic representation of the object can be mathematically sliced into multiple horizontal layers. The horizontal layers can have contours that will produce the shape of the object being formed by the additive manufacturing apparatus. The computing device component can generate a build path to form the contours for each horizontal layer and send control signals to the extrusion portion of the additive manufacturing apparatus to move a nozzle along the build path to deposit an amount of the material to form each of the horizontal layers. The horizontal layers are formed on top of each other to deposit fluent strands or "roads" of the build material in a layer-by-layer manner onto a platform or a build substrate. For example, the additive manufacturing system can move an extrusion head/nozzle, the platform/build substrate, or both the nozzle and platform vertically and horizontally relative to each other to form the object. The build material from which the object is formed hardens shortly after extrusion to form a solid 3D object.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

This application is directed to forming objects that include magnetic material via a 3D printing process. In an implementation, an article can be formed that includes a plurality of layers of a first polymeric material and at least one layer of a second polymeric material having a magnetic material. The article can be formed by depositing a plurality of layers of the first polymeric material onto a surface of a substrate and depositing at least one layer of a second polymeric material onto at least one layer of the plurality of layers of the first polymeric material. An apparatus can be used to form the article, where the apparatus includes a first material source for the first polymeric material and a second material source for the second polymeric material. The apparatus can also include a first extrusion component to deposit the plurality of layers of the first polymeric material onto the surface of the substrate. Additionally, the apparatus can include a second extrusion component to deposit the at least one layer of the second polymeric material onto the at least one layer of the plurality of layers of the first polymeric material.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

The technologies described herein are generally directed to forming objects including one or more layers of a polymeric material that include a magnetic material. In particular, the objects can be produced by forming one or more first layers that include a first polymeric material. The one or more first layers can be free of a magnetic material. Additionally, the object can be produced by forming one or more second layers that include a second polymeric material having a magnetic material. For example, the one or more second layers can include a polymeric material embedded with magnetic particles. The one or more first layers and the one or more second layers can be formed by extruding the first polymeric material and the second polymeric material onto a substrate. The one or more first layers and the one or more second layers can be deposited according to a pattern that is represented by computer readable data.

A magnetizing device can be used to magnetize the magnetic material included in the one or more second layers. In an implementation, the magnetizing device can be a component of the apparatus used to produce the one or more first layers and the one or more second layers. In a particular implementation, the magnetizing device can apply a magnetic field to the one or more second layers to align particles of the magnetic material. In this way, the one or more second layers can produce attractive or repulsive forces when placed in proximity with materials that can be influenced by a magnetic field.

Figure 1:
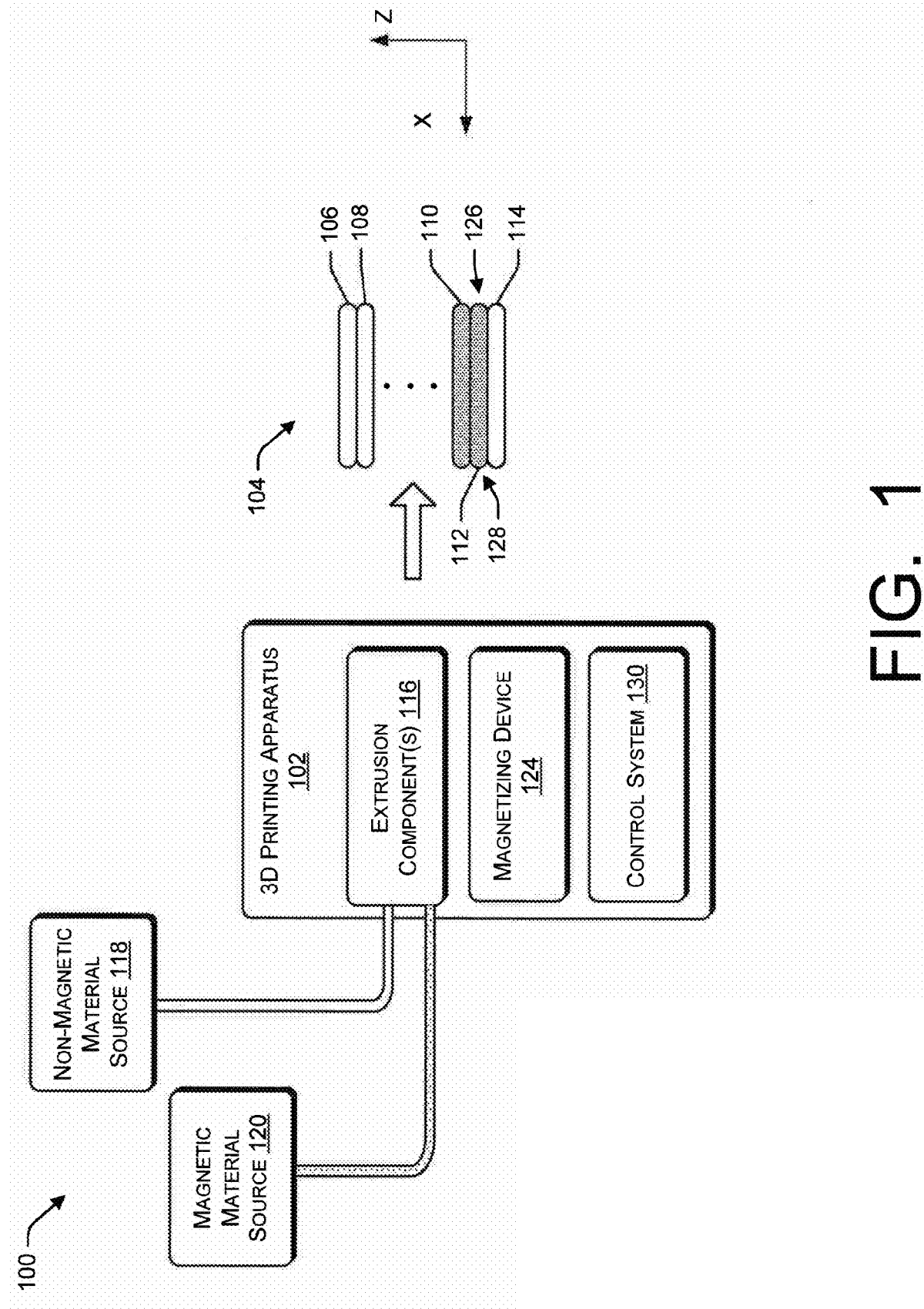
FIG. 1 illustrates an example framework to form objects including one or more layers of a polymeric material that include a magnetic material.

FIG. 1 illustrates an example framework 100 to form objects including one or more layers of a polymeric material that include a magnetic material. The framework 100 can include a three-dimensional (3D) printing apparatus 102 that can produce an object 104. In an implementation, the 3D printing apparatus 102 can produce the object 104 by depositing material in layers according to a pattern. For example, the object 104 can include a plurality of layers, such as representative layers 106, 108, 110, 112, 114. The layers 106, 108, 110, 112, 114 can include at least one polymeric material. In the illustrative implementation of FIG. 1, the layers 106, 108, 114 can include a first polymeric material. In addition, the layers 110, 112 can include a second polymeric material having a magnetic material.

The 3D printing apparatus 102 can include one or more extrusion components 116 to form the layers 106, 108, 110, 112, 114. The one or more extrusion components 116 can be coupled to a non-magnetic material source 118. The non-magnetic material source 118 can store the first polymeric material that is used to form the layers 106, 108, 114 of the object 104. The first polymeric material can be free of a magnetic material. As used herein, when a first material is referred to as being "free" of a second material, the first material does not contain any amount of the second material or contains trace amounts of the second material.

In addition, the one or more extrusion components 116 can be coupled to a magnetic material source 120. The magnetic material source 120 can store the second polymeric material that is used to form the layers 110, 112 of the object 104. In an implementation, the one or more extrusion components 116 can include a first extrusion head coupled to the non-magnetic material source 118 and a second extrusion head coupled to the magnetic material source 120. In a particular implementation, the non-magnetic material source 118 can include a filament of the first polymeric material that can be fed into the first extrusion head of the one or more extrusion components 116 to form the layers 106, 108, 114. Also, the magnetic material source 120 can include a filament of the second polymeric material that can be fed into the second extrusion head of the one or more extrusion components 116 to form the layers 110, 112.

The first polymeric material can include an amount of one or more polymers, such as an amount of one or more thermoplastic polymers. In an implementation, the first polymeric material can include an amount of one or more polyesters. Additionally, the first polymeric material can include an amount of a glycol-modified polyethylene terephthalate. Further, the first polymeric material can include an amount of a copolymer. To illustrate, the first polymeric material can include an amount of a copolyester. The first polymeric material can also include an amount of a polylactic acid, acrylonitrile butadiene styrene, a polycarbonate, a polyamide, a polyetherimide, a polystyrene, a polyphenylsulfone, a polysulfone, a polyethersulfone, a polyphenylene, a poly(methyl methacrylate), or combinations thereof.

The second polymeric material can include more than trace amounts of a magnetic material. The magnetic material included in the second polymeric material can include Neodymium (Nd), in some cases. In addition, the magnetic material included in the second polymeric material can include Niobium (Nb), in some scenarios. Further, the magnetic material included in the second polymeric material can include Boron (B). In still other instances, the magnetic material included in the second polymeric material can include Iron (Fe). In an illustrative implementation, the magnetic material can include a combination of Nd, Fe, and B. For example, the magnetic material included in the second polymeric material can include $Nd_2Fe_{14}B$. In another illustrative implementation, the magnetic material can include a combination of Nd, Fe, Nb, and B.

In an illustrative implementation, the second polymeric material can include an amount of magnetic material included in a range of about 1% by volume to about 5% by volume of a total volume of the second polymeric material. In another illustrative implementation, the second polymeric material can include an amount of magnetic material included in a range of about 2% by volume to about 10% by volume of a total volume of the second polymeric material. In an additional illustrative implementation, the second polymeric material can include an amount of magnetic material included in a range of about 8% by volume to about 20% by volume of a total volume of the second polymeric material. In a further illustrative implementation, the second polymeric material can include an amount of magnetic material included in a range of about 15% by volume to about 30% by volume of a total volume of the second polymeric material. In other illustrative implementations, the second polymeric material can include an amount of magnetic material included in a range of about 25% by volume to about 40% by volume of a total volume of the second polymeric material. In still further illustrative implementations, the second polymeric material can include an amount of magnetic material included in a range of about 35% by volume to about 50% by volume of a total volume of the second polymeric material. In still additional illustrative implementations, the second polymeric material can include an amount of magnetic material included in a range of about 45% by volume to about 60% by volume of a total volume of the second polymeric material. Also, the second polymeric material can include an amount of a magnetic material included in a range of about 55% by volume to about 75% by volume of a total volume of the second polymeric material. Furthermore, the second polymeric material can include an amount of a magnetic material included in a range of about 70% by volume to about 90% by volume of a total volume of the second polymeric material.

Further, the second polymeric material can include particles of magnetic material having a d50 of no greater than about 150 micrometers, no greater than about 125 micrometers, no greater than about 110 micrometers, no greater than about 90 micrometers, no greater than about 75 micrometers, or no greater than about 50 micrometers. The second polymeric material can also include particles of magnetic material having a d50 of at least about 2 micrometers, at least about 5 micrometers, at least about 10 micrometers, at least about 20 micrometers, at least about 25 micrometers, or at least about 30 micrometers. In an illustrative example, the second polymeric material can include particles of magnetic material having a d50 included in a range of about 2 micrometers to about 25 micrometers. In another illustrative example, the second polymeric material can include particles of magnetic material having a d50 included in a range of about 3 micrometers to about 10 micrometers. In an additional illustrative example, the second polymeric material can include particles of magnetic material having a d50 included in a range of about 20 micrometers to about 50 micrometers. In a further illustrative example, the second polymeric material can include particles of magnetic material having a d50 included in a range of about 40 micrometers to about 80 micrometers. In still other illustrative examples, the second polymeric material can include particles of magnetic material having a d50 included in a range of about 75 micrometers to about 150 micrometers.

In addition to the magnetic material, the second polymeric material can include an amount of one or more polymers, such as an amount of one or more thermoplastic polymers. In an implementation, the second polymeric material can include an amount of one or more polyesters. Additionally, the second polymeric material can include an amount of a glycol-modified polyethylene terephthalate. Further, the second polymeric material can include an amount of a copolymer. To illustrate, the second polymeric material can include an amount of a copolyester. The second polymeric material can also include an amount of a polylactic acid, acrylonitrile butadiene styrene, a polycarbonate, a polyamide, a polyetherimide, a polystyrene, a polyphenylsulfone, a polysulfone, a polyethersulfone, a polyphenylene, a poly(methyl methacrylate), or combinations thereof.

In an illustrative implementation, the second polymeric material can include an amount of one or more polymers included in a range of about 10% by volume to about 25% by volume of a total volume of the second polymeric material. In another illustrative implementation, the second polymeric material can include an amount of one or more polymers included in a range of about 20% by volume to about 40% by volume of a total volume of the second polymeric material. In an additional illustrative implementation, the second polymeric material can include an amount of one or more polymers included in a range of about 35% by volume to about 55% by volume of a total volume of the second polymeric material. In a further illustrative implementation, the second polymeric material can include an amount of one or more polymers included in a range of about 50% by volume to about 75% by volume of a total volume of the second polymeric material. In other illustrative implementations, the second polymeric material can include an amount of one or more polymers included in a range of about 70% by volume to about 80% by volume of a total volume of the second polymeric material. In still further illustrative implementations, the second polymeric material can include an amount of one or more polymers included in a range of about 75% by volume to about 85% by volume of a total volume of the second polymeric material. In still additional illustrative implementations, the second polymeric material can include an amount of one or more polymers included in a range of about 80% by volume to about 90% by volume of a total volume of the second polymeric material. Also, the second polymeric material can include an amount of one or more polymers included in a range of about 85% by volume to about 95% by volume of a total volume of the second polymeric material. Furthermore, the second polymeric material can include an amount of a one or more polymers included in a range of about 90% by volume to about 99% by volume of a total volume of the second polymeric material.

The first polymeric material and the second polymeric material can include other components, in some cases. For example, the first polymeric material and/or the second polymeric material can include various additives. To illustrate, the first polymeric material, the second polymeric material, or both can include pigment or dye to alter a color of the material. The first polymeric material and/or the second polymeric material can also include other additives that affect the optical properties of the material.

The 3D printing apparatus 102 can also include at least one magnetizing device 124 that can magnetize the magnetic material of the layers 110, 112. For example, the at least one magnetizing device 124 can include one or more magnets to apply a magnetic field to the magnetic particles of the layers 110, 112. By applying a magnetic field to the magnetic particles of the layers 110, 112, the magnetic particles of the layers 110, 112 can be aligned such that portions of the layers 110, 112 have a particular polarity. To illustrate, the layers 110, 112 can be magnetized such that respective portions of the layer 110 have a first polarity and a second polarity that is opposite the first polarity and that respective portions of the layer 112 have the first polarity and the second polarity. In this way, the layers 110, 112 can exhibit characteristics of magnetized particles. In an illustrative example, the layer 110 can be magnetized such that a first portion of the layer 110 having the first polarity is attracted to a portion of an additional object having the second polarity and is repelled by a portion of an additional object that has the first polarity. Continuing with this example, the layer 110 can include a second portion having the second polarity that is attracted to a portion of an additional object that has the first polarity and is repelled by a portion of an additional object having the second polarity.

In some cases, the portions of the layers 110, 112 having the first polarity and the second polarity can be arranged in the Z-direction. For example, the layer 112 can have a first sub-layer of magnetized particles that is adjacent to the layer 110 with the first sub-layer having a first polarity and a second sub-layer of magnetized particles that is adjacent to the layer 114 with the second sub-layer having a second polarity. In other cases, the portions of the layers 110, 112 having the first polarity and the second polarity can be arranged in the X-direction. To illustrate, the layer 112 can have a first portion of magnetized particles arranged at a first end 126 having the first polarity and a second portion of magnetized particles arranged at a second end 128 having the second polarity.

Although the illustrative example of FIG. 1 shows that the layers 110, 112 have magnetic material throughout, in other situations, the layer 110 and/or the layer 112 can partially include magnetic material. For example, the first portion of the layer 110 can have a magnetic material, while a second portion of the layer 110 is free of magnetic material. In other situations, the layer 110 can include multiple portions that include a magnetic material and multiple portions that are free of a magnetic material.

The 3D printing apparatus 102 also includes a control system 130 that controls the operation of the one or more extrusion components 116 and the at least one magnetizing device 124. For example, the control system 130 can send signals to the one or more extrusion components 116 to control the movement of the one or more extrusion components 116 to extrude the first polymeric material from the non-magnetic material source 118 to form one or more layers of the object 104. The control system 130 can also send signals to the one or more extrusion components 116 to control the movement of the one or more extrusion components 116 to extrude the second polymeric material from the magnetic material source 120 to form one or more additional layers of the object 104. The control system 130 can also send signals to the at least one magnetizing device 124 to cause the magnetizing device 124 to generate a magnetic field and move the magnetizing device 124 such that the magnetic field is applied to portions of the object 104 that include magnetic material.

Figure 2:
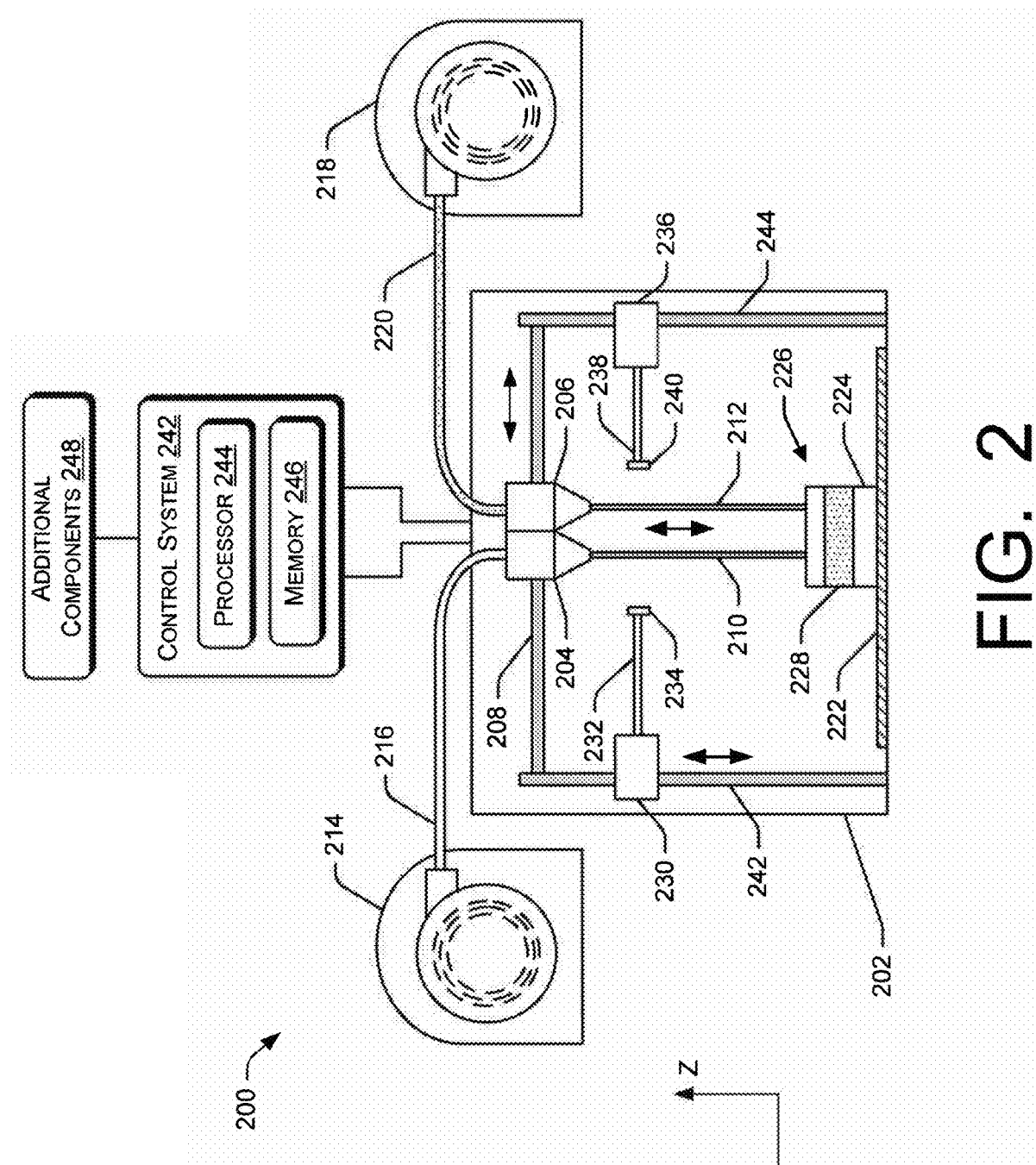
FIG. 2 illustrates a first example apparatus to form objects including one or more layers of a polymeric material that include a magnetic material and to magnetize the magnetic material.

FIG. 2 illustrates a first example apparatus 200 to form objects including one or more layers of a polymeric material that include a magnetic material and to magnetize the magnetic material. In some instances, the system 200 can be considered a Fused Deposition Modeling® (FDM®) system, a fused filament fabrication (FFF) system, or more generally, a 3D printing system (or 3D printer).

The apparatus 200 can include a housing 202 for a number of the components of the apparatus 200. The housing 202 can be formed from a number of materials, such as one or more metals, one or more polymers, or a combination thereof. The apparatus 200 can also include a first extrusion head 204 and a second extrusion head 206. The first extrusion head 204 and the second extrusion head 206 can be mounted on a horizontal rail 208. The first extrusion head 204 and the second extrusion head 206 can move along the horizontal rail 208 in the X-direction. In an implementation, the first extrusion head 204 and the second extrusion head 206 can move along the horizontal rail 208 by the use of one or more stepper motors, one or more servo motors, one or more microcontrollers, one or more belts, combinations thereof, and the like. In some cases, the first extrusion head 204 and the second extrusion head 206 can move in tandem along the horizontal rail 208. In a particular implementation, the first extrusion head 204 and the second extrusion head 206 can be coupled together. In other cases, the first extrusion head 204 and the second extrusion head 206 can move separately along the horizontal rail 208.

The apparatus 200 can also include a first vertical rail 210 and a second vertical rail 212. The first extrusion head 204 can move in the Z-direction along the first vertical rail 212 and the second extrusion head 206 can move in the Z-direction along the second vertical rail 214. In some scenarios, the first extrusion head 204 and the second extrusion head 206 can move in tandem along the first vertical rail 210 and the second vertical rail 212. In other instances, the first extrusion head 204 and the second extrusion head 206 can move separately along the first vertical rail 210 and the second vertical rail 212. In a particular implementation, the first vertical rail 210 and the second vertical rail 212 can be arranged to move in the X-direction along the horizontal rail 208. The first vertical rail 210 and the second vertical rail 212 can move together along the horizontal rail 208, in some cases, while in other situations, the first vertical rail 210 and the second vertical rail 212 can move separately along the horizontal rail 208.

The first extrusion head 204, the second extrusion head 206, or both can move along the horizontal rail 208, the first vertical rail 210, and/or the second vertical rail 212 at a speed of at least about 5 mm/second, at least about 10 mm/second, at least about 25 mm/second, at least about 50 mm/second, at least about 75 mm/second or at least about 125 mm/second. In addition, first extrusion head 204, the second extrusion head 206, or both can move along the horizontal rail 208, the first vertical rail 210, and/or the second vertical rail 212 at a speed no greater than about 400 mm/second, no greater than about 350 mm/second, no greater than about 300 mm/second, no greater than about 250 mm/second, no greater than about 200 mm/second, or no greater than about 150 mm/second. In an illustrative example, the first extrusion head 204, the second extrusion head 206, or both can move along the horizontal rail 208, the first vertical rail 210, and/or the second vertical rail 212 at a speed included in a range of about 2 mm/second to about 500 mm/second. In another illustrative example, the first extrusion head 204, the second extrusion head 206, or both can move along the horizontal rail 208, the first vertical rail 210, and/or the second vertical rail 212 at a speed included in a range of about 20 mm/second to about 300 mm/second. In an additional illustrative example, the first extrusion head 204, the second extrusion head 206, or both can move along the horizontal rail 208, the first vertical rail 210, and/or the second vertical rail 212 at a speed included in a range of about 30 mm/second to about 100 mm/second.

The apparatus 200 can also include a first material source 214 that stores a first polymeric material that is free of a magnetic material. The first material source 214 can be coupled to the first extrusion head 204 by a first supply line 216. In addition, the apparatus 200 includes a second material source 218 that stores a second polymeric material that includes at least one magnetic material. The second material source 218 can be coupled to the second extrusion head 206 by a second supply line 220. The first polymeric material can be fed into the first extrusion head 204 from the first material source 214 in order to form one or more layers of the first polymeric material on a platform 222 of the apparatus 200, such as a first layer 224 of an object 226. In some situations, the platform 222 can also be referred to herein as a substrate. The second polymeric material can be fed into the second extrusion head 206 from the second material source 218 in order to form one or more layers of the second polymeric material on the platform 222, such as a second layer 228 of the object 226. In some cases, instead of moving the first extrusion head 204 and/or the second extrusion head 206 along the first vertical rail 210 and the second vertical rail 212, respectively, while forming the object 226, the platform 222 can be moved along the first vertical rail 210 and the second vertical rail 212. In other situations, the first extrusion head 204, the second extrusion head 206, and the platform 222 can be moved along the first vertical rail 210 and the second vertical rail 212 during the formation of the object 226.

The platform 222 can be provided as a "working surface" for building the object 226. In some cases, an additional substrate (not shown) can be mounted on the platform 222 as a working surface for building the object 226 and the one or more layers of the first polymeric material and the second polymeric material can be formed on the additional substrate rather than being formed on the platform 222 itself. During operation of the apparatus 200, the platform 222 can be initially positioned below the first extrusion head 204 and the second extrusion head 206 in a direction along the Z-axis. The platform 222 and/or the first extrusion head 204 and the second extrusion head 206 can be positioned such that the distance at which a layer of the object 226 is spaced below the first extrusion head 204 and/or the second extrusion head 206 can be a distance allowing for the deposition of fluent strands or "roads" of build material at a desired thickness. In some instances, a distance between the object 226 and the first extrusion head 204 and/or the second extrusion head 206 can be within a range from about 0.02 mm to about 4 mm. As layers of the object 226 are deposited, the first extrusion head 204 and/or the second extrusion head 206 can be positioned a distance in increments in the Z-direction that allows for depositing a next layer of the object 226 at a desired thickness. In some examples, the incremented distance can be about 0.1 mm.

Additionally, in some implementations, the platform 222 can be heated to aid in the adhesion of the object 226 to the platform 222 during the formation of the object 226. In an illustrative example, the platform 222 can be heated at a temperature included in a range of about 30° C. to about 125° C. In another illustrative example, the platform 222 can be heated at a temperature included in a range of about 40°

C. to about 90° C. In some instances, the temperature at which the platform 222 is heated can depend on a glass transition temperature of at least one of the build materials being deposited onto the platform 222 to form the object 226. Further, heating the platform 222 can provide an anti-warping effect on the build material used to form the object 226. Heating of the platform 222 can be performed by suitable heating elements, such as electrical elements that can be turned on or off, gas heating elements below the platform 222, or another suitable heating element. In some situations, though, the platform 222 may not be heated.

In an implementation, the first material source 214 and the second material source 218 can individually include a material bay or housing containing a spool of build material filament that can be unwound from the spool by a motor or drive unit. In some examples, supplying of the build material through the first supply line 216 and/or the second supply line 218 can be turned on or off, and the build material can be advanced in both forward and backward directions along the first supply line 216 and/or the second supply line 218. Retraction of the first polymeric material along the first supply line 216 toward the first material source and retraction of the second polymeric material along the second supply line 220 toward the second material source 218 can be advantageous to prevent "drool" at the respective extrusion head 204, 206 and/or to recycle unused build material after finishing an object. Moreover, the rate at which the first polymeric material is supplied to the first extrusion head 204 and the rate at which the second polymeric material is supplied to the second extrusion head 206 can be controlled by a drive unit (e.g., worm drive) at varying speeds so that speeds can be increased or decreased.

Filaments of the first polymeric material and/or the second polymeric material can have a diameter of at least about 0.5 mm, at least about 1 mm, at least about 1.5 mm, or at least about 2 mm. In addition, filaments of the first polymeric material and/or the second polymeric material can have a diameter no greater than about 7 mm, no greater than about 5 mm, no greater than about 3 mm, or no greater than about 2.5 mm. In an illustrative example, the diameter of first polymeric material and/or the diameter of the second polymeric material can be included in a range of about 0.2 mm to about 10 mm. In another illustrative example, the diameter of the first polymeric material and/or the diameter of the second polymeric material can included in a range of about 1.7 mm to about 2.9 mm.

The first extrusion head 204 and the second extrusion head 206 can be configured to extrude material onto the platform 222 during the process of forming the object 226. The first extrusion head 204 and the second extrusion head 206 can be a suitable type of extrusion head configured to receive material and to extrude the material through a nozzle (or tip) that includes an orifice from which fluent strands or "roads" of the material can be deposited onto the platform 222 in a layer-by-layer manner to form the object 226. In an implementation, nozzles of varying-sized orifices can be utilized for depositing roads of build material having different thicknesses from the first extrusion head 204 and/or the second extrusion head 206.

In some cases, the first extrusion head 204 can include a heating element that heats the first polymeric material to a temperature that causes the first polymeric material to become flowable before extruding the first polymeric material onto the platform 222. Additionally, the second extrusion head 206 can include a heating element that heats the second polymeric material to a temperature that causes the second polymeric material to become flowable before extruding the second polymeric material onto the platform 222. The temperature applied to the first polymeric material in the first extrusion head 204 and the temperature applied to the second polymeric material in the second extrusion head 206 can vary depending on the material being heated. For example, a first temperature can be applied to heat the first polymeric material and a second temperature can be applied to heat the second polymeric material.

The temperature applied to heat the first polymeric material in the first extrusion head 204 and/or the temperature applied to heat the second polymeric material in the second extrusion head 206 can be at least about 150° C., at least about 170° C., at least about 190° C., or at least about 210° C. Additionally, the temperature applied to heat the first polymeric material in the first extrusion head 204 and/or the temperature applied to heat the second polymeric material in the second extrusion head 206 can be no greater than about 350° C., no greater than about 300° C., no greater than about 280° C., no greater than about 260° C., or no greater than about 240° C. In an illustrative example, the temperature applied to heat the first polymeric material in the first extrusion head 204 and/or the temperature applied to heat the second polymeric material in the second extrusion head 206 can be included in a range of about 135° C. to about 360° C. In another illustrative example, the temperature applied to heat the first polymeric material in the first extrusion head 204 and/or the temperature applied to heat the second polymeric material in the second extrusion head 206 can be included in a range of about 230° C. to about 290° C.

Additionally, the temperature applied to heat the first polymeric material in the first extrusion head 204 and/or the temperature applied to heat the second polymeric material in the second extrusion head 206 can be based on a glass transition temperature of the material. For example, the temperature applied to heat the first polymeric material in the first extrusion head 204 can be within about 2° C. of the glass transition temperature of the first polymeric material and the temperature applied to heat the second polymeric material in the second extrusion head 206 can be within about 2° C. of the glass transition temperature of the second polymeric material. In another example, the temperature applied to heat the first polymeric material in the first extrusion head 204 can be within about 5° C. of the glass transition temperature of the first polymeric material and the temperature applied to heat the second polymeric material in the second extrusion head 206 can be within about 5° C. of the glass transition temperature of the second polymeric material. In an additional example, the temperature applied to heat the first polymeric material in the first extrusion head 204 can be within about 12° C. of the glass transition temperature of the first polymeric material and the temperature applied to heat the second polymeric material in the second extrusion head 206 can be within about 12° C. of the glass transition temperature of the second polymeric material. In a further example, the temperature applied to heat the first polymeric material in the first extrusion head 204 can be within about 25° C. of the glass transition temperature of the first polymeric material and the temperature applied to heat the second polymeric material in the second extrusion head 206 can be within about 25° C. of the glass transition temperature of the second polymeric material.

The apparatus 200 also includes a first magnetizing device 230 having a first arm 232 and a first magnetic plate 234. Additionally, the apparatus 200 includes a second magnetizing device 236 having a second arm 238 and a second magnetic plate 240. The first magnetizing device 230 and the second magnetizing device 236 can create magnetic fields to magnetize magnetic materials of the object 226. The first magnetizing device 230 can be disposed on a third vertical rail 242 and the second magnetizing device 236 can be disposed on a fourth vertical rail 244. The first magnetizing device 230 can move in the Z-direction along the third vertical rail 242 and the second magnetizing device 236 can move in the Z-direction along the fourth vertical rail 244. In some implementations, the first arm 232 and the second arm 238 can be retractable or otherwise be configured to modify a respective length of the first arm 232 or a respective length of the second arm 238. Magnetizing magnetic material in the object 226 will be discussed in more detail with respect to FIG. 4 and FIG. 5.

The apparatus 200 can include a control system 242. The control system 242 can include one or more hardware processor devices represented by processor 244 and one or more physical memory devices represented by memory 246. In some cases, the processor 244 can be a single processing unit or a number of processing units, any of which can include single or multiple computing units or multiple cores. Additionally, the processor 244 can be implemented as one or more microprocessors, microcomputers, microcontrollers, digital signal processors, central processing units, state machines, logic circuitries, and/or any devices that manipulate signals based on operational instructions. Among other capabilities, the processor 244 can be configured to fetch and execute computer-readable instructions, such as computer readable instructions stored in the memory 246.

The memory 246 can be examples of computer storage media for storing instructions which are executed by the processor 244 to perform various functions. In an example, the memory 246 can generally include both volatile memory and non-volatile memory (e.g., RAM, ROM, or the like). The memory 246 can also include one or more cache memory devices, one or more buffers, one or more flash memory devices, or a combination thereof. Computer storage media includes volatile and non-volatile, removable and non-removable media implemented in any method or technology for storage of information, such as computer readable instructions, data structures, program modules, or other data. Additionally, computer storage media includes, but is not limited to, random access memory (RAM), read only memory (ROM), electrically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media can embody computer readable instructions, data structures, program modules, or other data in a modulated data signal, such as a carrier wave. As defined herein, computer storage media does not include communication media.

The apparatus 244 can also include one or more additional components 248. For example, the one or more additional components 248 can include one or more input/output devices, such as a keyboard, a mouse, a touch screen, a display, speakers, a microphone, a camera, combinations thereof, and the like. The one or more additional components 248 can also include one or more communication interfaces for exchanging data with other devices, such as via a network, direct connection, or the like. For example, the communication interfaces can facilitate communications within a wide variety of networks or connections, such as one or more wired networks or wired connections and/or one or more wireless networks or wireless connections.

The control system 242 can include, be coupled to, or obtain data from a computer-aided design (CAD) system to provide a digital representation of the object 226 to be formed by the apparatus 200. Any suitable CAD software program can be utilized to create the digital representation of the object 226. For example, a user can design, using a 3D modeling software program executing on a host computer, an object having a particular shape with specified dimensions, such as the object 226, that is to be manufactured using the apparatus 200. In order to translate the geometry of the object 226 into computer-readable instructions or commands usable by processor 244 or a suitable controller in forming the object 226, the control system 242 can mathematically slice the digital representation of the object 226 into multiple horizontal layers. The control system 242 can then design build paths along which build material is to be deposited in a layer-by-layer fashion to form the object 226.

The control system 242 can manage and/or direct one or more components of the apparatus 200, such as the first extrusion head 204 and/or the second extrusion head 206, by controlling movement of those components according to a numerically controlled computer-aided manufacturing (CAM) program along computer-controlled paths. The movement of the various components, such as the first extrusion head 204, the second extrusion head 206, or both, can be performed by the use of stepper motors, servo motors, microcontrollers, combinations thereof, and the like.

In an illustrative implementation, the control system 242 can control the supply of the first polymeric material from the first material supply 214 to the first extrusion head 204 and the supply of the second polymeric material from the second material supply 218 to the second extrusion head 206. As build material is supplied to the first extrusion head 204 and/or the second extrusion head 208, the control system 242 can direct the movement of the first extrusion head 204 and/or the second extrusion head 206 along the horizontal rail 206, the first vertical rail 210, the second vertical rail 212, or a combination thereof, so that the first extrusion head 204, the second extrusion head 206, or both can follow a predetermined build path while depositing build material for each layer of the object 226. In this sense, the horizontal rail 208, the first vertical rail 210, and/or the second vertical rail 212, such as a gantry, allow the first extrusion head 204 and/or the second extrusion head 206 to move two-dimensionally and/or three-dimensionally in vertical and/or horizontal directions as shown by the arrows in FIG. 2. Additionally, or alternatively, the platform 222 can be movable in two-dimensions and/or three-dimensions, and such movement can be controlled by the control system 242 to provide similar relative movement between the platform 222 and the first extrusion head 204 and the second extrusion head 206 so that multiple roads of build material can be deposited by moving the first extrusion head 204, the second extrusion head 206, the platform 222, in a two-dimensional (2D) horizontal plane (i.e., X-Y plane) to form each layer of the object 226, and then multiple successive layers can be deposited on top of one another by moving the first extrusion head 204, the second extrusion head 206, and/or the platform 222 in a vertical Z-direction.

The control system 242 can also control the movement of the first magnetizing device 230 along the third vertical rail 242, the movement of the second magnetizing device 236 along the fourth vertical rail 244, and/or the movement of the platform 222 such that the first magnetizing device 230 and/or the second magnetizing device 236 can be located proximate to portions of the object 226 that include magnetic material. The control system 242 can also control when a magnetic field is to be generated by the first magnetizing device 230 and the second magnetizing device 236 by providing signals to provide current to the first magnetizing device 230 and/or the second magnetizing device 236. The control system 242 can control a magnitude of the current provided to the first magnetizing device 230 and/or a magnitude of the current provided to the second magnetizing device 236. Additionally, the control system 242 can control a duration for which the magnetic field is generated by the first magnetizing device 230 and/or the second magnetizing device 236. Furthermore, the control system 242 can control a configuration and/or location of the first arm 232, a configuration and/or location of the second arm 238 to position the first magnetic plate 234 and the second magnetic plate 240 to magnetize portions of the object 226.

The object 226 can be formed in a controlled environment, such as by confining individual ones of the components of the apparatus 200 to a chamber or other enclosure formed by the housing 202 where temperature, and optionally other parameters (e.g., pressure) can be controlled and maintained at a desired level by elements configured to control temperature, pressure, etc. (e.g., heating elements, pumps, etc.). In some instances, the temperature applied to the build material can correspond to a temperature at or above the creep-relaxation temperature of the build material. This can allow more gradual cooling of the build material as it is deposited onto the platform 222 so as to prevent warping of the layers of the object 226 upon deposition.

Although FIG. 2 illustrates one illustrative example of certain components of an additive manufacturing system usable for carrying out the techniques disclosed herein, it is to be appreciated that the configuration and inclusion of certain components shown in FIG. 2 is one, non-limiting, example of a suitable additive manufacturing system. Namely, other types and configurations of additive manufacturing systems can be utilized with the techniques and materials disclosed herein without changing the basic characteristics of the apparatus 200, and the apparatus 200 can be implemented as any suitable size for a particular industry or application, such as industrial-sized for commercial object production and/or testing, desktop-sized, handheld for consumer-use, and so on. For example, although the illustrative example of FIG. 2 shows that the apparatus 200 includes two magnetizing devices and two arms, the apparatus 200 can include a different number of magnetizing devices and a different number of arms. To illustrate, in some cases, the apparatus 200 can include more than two magnetizing devices and more than two arms. In other implementations, the apparatus 200 can be configured to include a single magnetizing device and/or a single arm.

Figure 3:
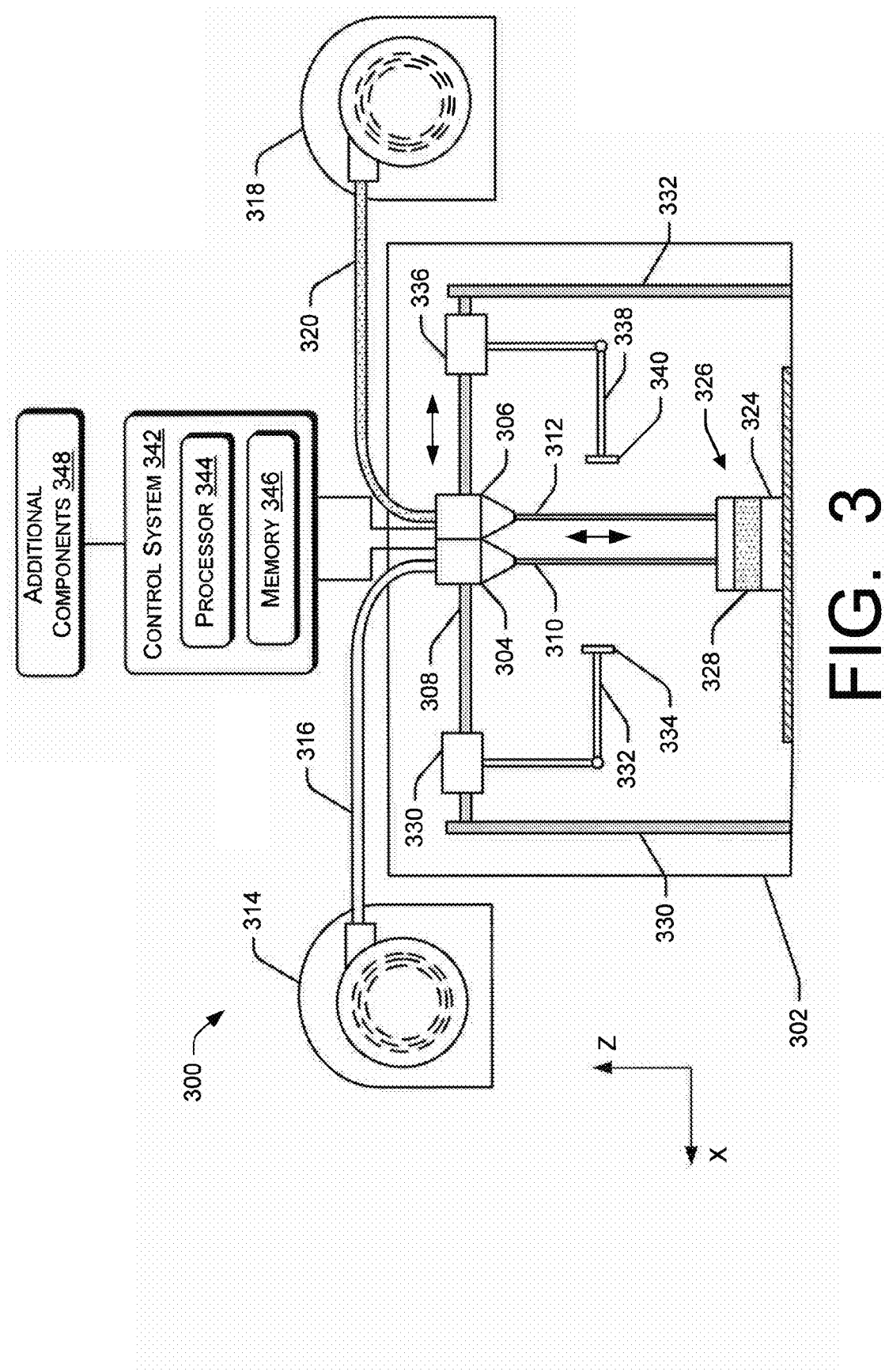
FIG. 3 illustrates a second example apparatus to form objects including one or more layers of a polymeric material that include a magnetic material and to magnetize the magnetic material.

FIG. 3 illustrates a second example apparatus 300 to form objects including one or more layers of a polymeric material that include a magnetic material and to magnetize the magnetic material. The apparatus 300 includes components that are the same or similar to corresponding components described with respect to the apparatus 200 of FIG. 2 with the exception of the arrangement of the magnetizing devices of the apparatus 300. Thus, the details of many of the components of the apparatus 300 are omitted because the features of these components have been described in detail previously with respect to FIG. 2.

The apparatus 300 can include a housing 302 for a number of the components of the apparatus 300. The housing 302 can be formed from a number of materials, such as one or more metals, one or more polymers, or a combination thereof. The apparatus 300 can also include a first extrusion head 304 and a second extrusion head 306. The first extrusion head 304 and the second extrusion head 306 can be mounted on a horizontal rail 308. The first extrusion head 304 and the second extrusion head 306 can move along the horizontal rail 208 in the X-direction. In an implementation, the first extrusion head 304 and the second extrusion head 306 can move along the horizontal rail 308 by the use of one or more stepper motors, one or more servo motors, one or more microcontrollers, one or more belts, combinations thereof, and the like. In some cases, the first extrusion head 304 and the second extrusion head 306 can move in tandem along the horizontal rail 308. In a particular implementation, the first extrusion head 304 and the second extrusion head 306 can be coupled together. In other cases, the first extrusion head 304 and the second extrusion head 306 can move separately along the horizontal rail 308.

The apparatus 300 can also include a first vertical rail 310 and a second vertical rail 312. The first extrusion head 304 can move in the Z-direction along the first vertical rail 312 and the second extrusion head 306 can move in the Z-direction along the second vertical rail 314. In some scenarios, the first extrusion head 304 and the second extrusion head 306 can move in tandem along the first vertical rail 310 and the second vertical rail 312. In other instances, the first extrusion head 304 and the second extrusion head 306 can move separately along the first vertical rail 310 and the second vertical rail 312. In a particular implementation, the first vertical rail 310 and the second vertical rail 312 can be arranged to move in the X-direction along the horizontal rail 308. The first vertical rail 310 and the second vertical rail 312 can move together along the horizontal rail 308, in some cases, while in other situations, the first vertical rail 310 and the second vertical rail 312 can move separately along the horizontal rail 308.

The apparatus 300 can also include a first material source 314 that stores a first polymeric material that is free of a magnetic material. The first material source 314 can be coupled to the first extrusion head 304 by a first supply line 316. In addition, the apparatus 300 includes a second material source 318 that stores a second polymeric material that includes at least one magnetic material. The second material source 318 can be coupled to the second extrusion head 306 by a second supply line 320. The first polymeric material can be fed into the first extrusion head 304 from the first material source 314 in order to form one or more layers of the first polymeric material on a platform 322 of the apparatus 300, such as a first layer 324 of an object 326. The second polymeric material can be fed into the second extrusion head 306 from the second material source 318 in order to form one or more layers of the second polymeric material on the platform, such as a second layer 328 of the object 326. In some cases, instead of moving the first extrusion head 304 and/or the second extrusion head 306 along the first vertical rail 310 and the second vertical rail 312, respectively, while forming the object 326, the platform 322 can be moved along the first vertical rail 310 and the second vertical rail 312. In other situations, the first extrusion head 304, the second extrusion head 306, and the platform 322 can be moved along the first vertical rail 310 and the second vertical rail 312 during the formation of the object 326.

The platform 322 can be provided as a "working surface" for building the object 326. In some cases, an additional substrate (not shown) can be mounted on the platform 322 as a working surface for building the object 326. During operation of the apparatus 300, the platform 322 can be initially positioned below the first extrusion head 304 and the second extrusion head 306 in a direction along the Z-axis. The platform 322 and/or the first extrusion head 304 and the second extrusion head 306 can be positioned such that the distance at which a layer of the object 326 is spaced below the first extrusion head 304 and/or the second extrusion head 306 can be any suitable distance allowing for the deposition of fluent strands or "roads" of build material at a desired thickness. As layers of the object 326 are deposited, the first extrusion head 304 and/or the second extrusion head 306 can be positioned a distance in increments in the Z-direction that allows for depositing a next layer of the object 326 at a desired thickness.

Additionally, in some implementations, the platform 322 can be heated to aid in the adhesion of the object 326 to the platform 322 during the formation of the object 326. In some instances, the temperature at which the platform 322 is heated can depend on a glass transition temperature of at least one of the build materials being deposited onto the platform 322 to form the object 326. Further, heating the platform 322 can provide an anti-warping effect on the build material used to form the object 326. Heating of the platform 326 can be performed by any suitable heating elements, such as electrical elements that can be turned on or off, gas heating elements below the platform 322, or any other suitable heating element. In some situations, though, the platform 322 may not be heated.

In an implementation, the first material source 314 and the second material source 318 can individually include a material bay or housing containing a spool of build material filament that can be unwound from the spool by a motor or drive unit. In some examples, supplying of the build material through the first supply line 316 and/or the second supply line 318 can be turned on or off, and the build material can be advanced in both forward and backward directions along the first supply line 316 and/or the second supply line 318. Moreover, the rate at which the first polymeric material is supplied to the first extrusion head 304 and the rate at which the second polymeric material is supplied to the second extrusion head 306 can be controlled by a drive unit (e.g., worm drive) at varying speeds so that speeds can be increased or decreased.

The first extrusion head 304 and the second extrusion head 306 can be configured to extrude material onto the platform 322 during the process of forming the object 326. The first extrusion head 304 and the second extrusion head 306 can be any suitable type of extrusion head configured to receive material and to extrude the material through a nozzle (or tip) that includes an orifice from which fluent strands or "roads" of the material can be deposited onto the platform 322 in a layer-by-layer manner to form the object 326. In an implementation, nozzles of varying-sized orifices can be utilized for depositing roads of build material having different thicknesses from the first extrusion head 304 and/or the second extrusion head 306.

In some cases, the first extrusion head 304 can include a heating element that heats the first polymeric material to a temperature that causes the first polymeric material to become flowable before extruding the first polymeric material onto the platform 322. Additionally, the second extrusion head 306 can include a heating element that heats the second polymeric material to a temperature that causes the second polymeric material to become flowable before extruding the second polymeric material onto the platform 322. The temperature applied to the first polymeric material in the first extrusion head 304 and the temperature applied to the second polymeric material in the second extrusion head 306 can vary depending on the material being heated. For example, a first temperature can be applied to heat the first polymeric material and a second temperature can be applied to heat the second polymeric material.

The apparatus 300 also includes a first magnetizing device 330 having a first arm 332 and a first magnetic plate 334. Additionally, the apparatus 300 includes a second magnetizing device 336 having a second arm 338 and a second magnetic plate 340. The first magnetizing device 330 and the second magnetizing device 336 can create magnetic fields to magnetize magnetic materials of the object 326. The first magnetizing device 330 and the second magnetizing device 336 can be disposed on the horizontal rail 308. The first magnetizing device 330 and the second magnetizing device 336 can move in the X-direction along the horizontal rail 308. In some implementations, the first arm 332 and the second arm 338 can be retractable or otherwise be configured to modify a respective length. Additionally, the first arm 332 can include one or more elbows and the second arm 338 can include one or more elbows that enable the first arm 332 and the second arm 338 to be arranged in a number of configurations to apply a magnetic field to the object 326 and magnetize materials of the object 326 located at a number of positions within the object 326. Magnetizing magnetic material in the object 326 will be discussed in more detail with respect to FIG. 4 and FIG. 5.

The apparatus 300 can include a control system 342. The control system 342 can include one or more hardware processor devices represented by processor 344 and one or more physical memory devices represented by memory 346. Among other capabilities, the processor 344 can be configured to fetch and execute computer-readable instructions, such as computer readable instructions stored in the memory 346. The memory 346 can be an example of computer storage media for storing instructions which are executed by the processor 344 to perform various functions.

The apparatus 344 can also include one or more additional components 348. For example, the one or more additional components 348 can include one or more input/output devices, such as a keyboard, a mouse, a touch screen, a display, speakers, a microphone, a camera, combinations thereof, and the like. The one or more additional components 348 can also include one or more communication interfaces for exchanging data with other devices, such as via a network, direct connection, or the like. For example, the communication interfaces can facilitate communications within a wide variety of networks or connections, such as one or more wired networks or wired connections and/or one or more wireless networks or wireless connections.

The control system 342 can include, be coupled to, or obtain data from a computer-aided design (CAD) system to provide a digital representation of the object 326 to be formed by the apparatus. In an implementation, the control system 342 can manage and/or direct one or more components of the apparatus 300, such as the first extrusion head 304 and/or the second extrusion head 306, by controlling movement of those components according to a numerically controlled computer-aided manufacturing (CAM) program along computer-controlled paths. The movement of the various components, such as the first extrusion head 304, the second extrusion head 306, or both, can be performed by the use of stepper motors, servo motors, microcontrollers, combinations thereof, and the like.

In an illustrative implementation, the control system 342 can control the supply of the first polymeric material from the first material supply 314 to the first extrusion head 304 and the supply of the second polymeric material from the second material supply 318 to the second extrusion head 306. As build material is supplied to the first extrusion head 304 and/or the second extrusion head 308, the control system 342 can direct the movement of the first extrusion head 304 and/or the second extrusion head 306 along the horizontal rail 308, the first vertical rail 310, the second vertical rail 312, or a combination thereof, so that the first extrusion head 304, the second extrusion head 306, or both can follow a predetermined build path while depositing build material for each layer of the object 326. In this sense, the horizontal rail 308, the first vertical rail 310, and/or the second vertical rail 312 allow the first extrusion head 304 and/or the second extrusion head 306 to move two-dimensionally and/or three-dimensionally in vertical and/or horizontal directions as shown by the arrows in FIG. 3. Additionally, or alternatively, the platform 322 can be movable in two-dimensions and/or three-dimensions, and such movement can be controlled by the control system 342 to provide similar relative movement between the platform 322 and the first extrusion head 304 and the second extrusion head 306 so that multiple roads of build material can be deposited by moving the first extrusion head 304, the second extrusion head 306, the platform 322, in a two-dimensional (2D) horizontal plane (i.e., X-Y plane) to form each layer of the object 326, and then multiple successive layers can be deposited on top of one another by moving the first extrusion head 304, the second extrusion head 306, and/or the platform 322 in a vertical Z-direction.

The control system 342 can also control the movement of the first magnetizing device 330 and the second magnetizing device 336 along the horizontal rail 308 and/or the movement of the platform 322 to be located proximate to portions of the object 326 that include magnetic material. The control system 342 can also control when a magnetic field is to be generated by the first magnetizing device 330 and the second magnetizing device 336 by providing signals to direct current to the first magnetizing device 330 and/or the second magnetizing device 336. The control system 342 can control a magnitude of the current provided to the first magnetizing device 330 and/or a magnitude of the current provided to the second magnetizing device 336. Additionally, the control system 342 can control a duration for which the magnetic field is generated by the first magnetizing device 330 and/or the second magnetizing device 336. Furthermore, the control system 342 can control a configuration and/or location of the first arm 332, a configuration and/or location of the second arm 338 to position the first magnetic plate 334 and the second magnetic plate 340 to magnetize portions of the object 326.

Although FIG. 3 illustrates one illustrative example of certain components of an additive manufacturing system usable for carrying out the techniques disclosed herein, it is to be appreciated that the configuration and inclusion of certain components shown in FIG. 3 is one, non-limiting, example of a suitable additive manufacturing system. Namely, other types and configurations of additive manufacturing systems can be utilized with the techniques and materials disclosed herein without changing the basic characteristics of the apparatus 300, and the apparatus 300 can be implemented as any suitable size for a particular industry or application, such as industrial-sized for commercial object production and/or testing, desktop-sized, handheld for consumer-use, and so on. For example, although the illustrative example of FIG. 3 shows that the apparatus 300 includes two magnetizing devices and two arms, the apparatus 300 can include a different number of magnetizing devices and a different number of arms. To illustrate, in some cases, the apparatus 300 can include more than two magnetizing devices and more than two arms. In other implementations, the apparatus 300 can be configured to include a single magnetizing device and/or a single arm. In addition, although FIG. 3 shows that the first arm 332 has a single elbow and the second arm 338 has a single elbow, arms of the apparatus 300 can include a different number of elbows or no elbows. Further, the apparatus 300 can include components that are alternatives to the elbows that enable the parts of an arm to rotate, such as a hinge or another type of rotatable connector.

Figure 4:
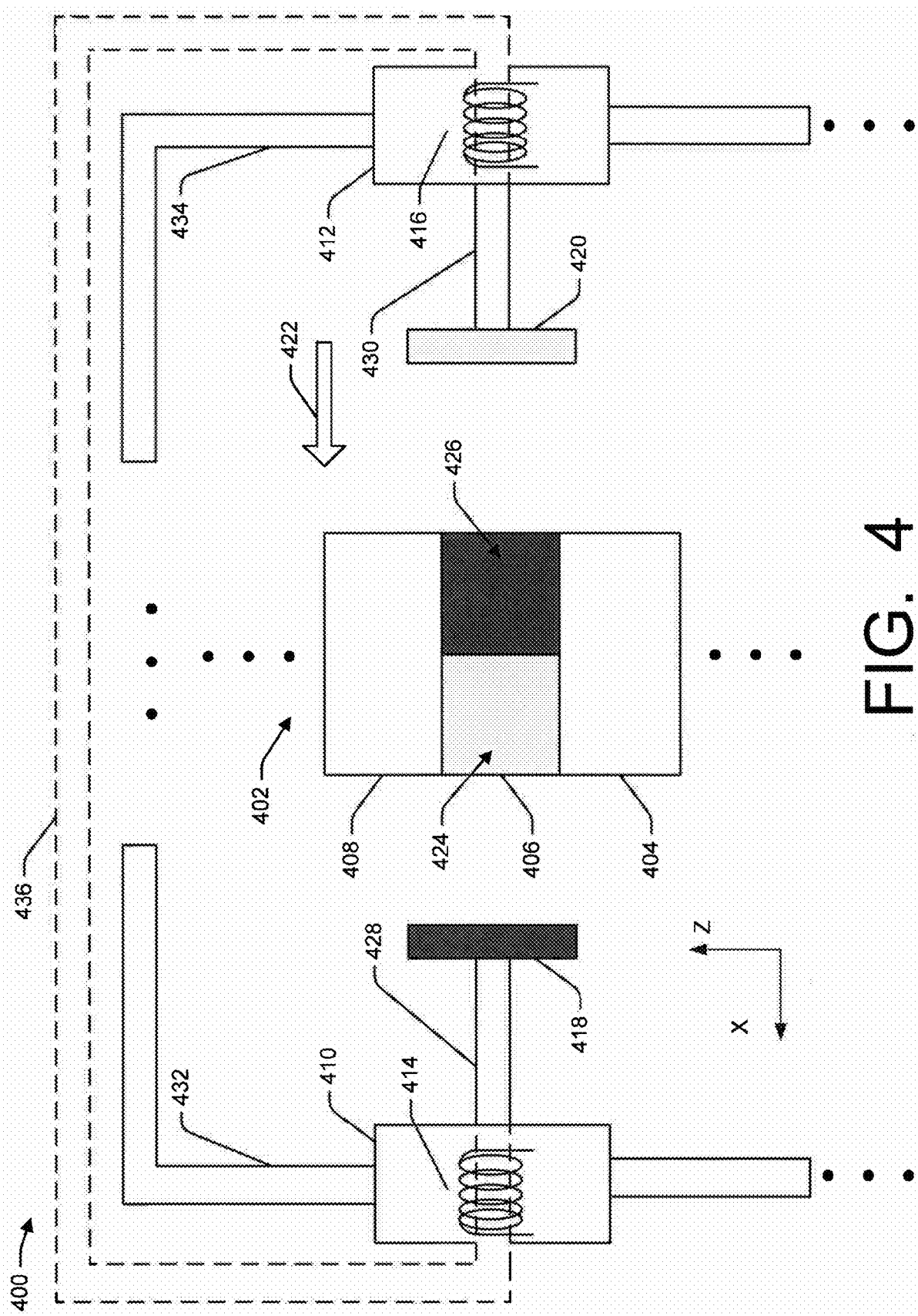
FIG. 4 illustrates a first example apparatus to magnetize magnetic material included in a layer of an object by applying a magnetic field to the magnetic material.

FIG. 4 illustrates a first example apparatus 400 to magnetize magnetic material included in a layer of an object 402 by applying a magnetic field to the magnetic material. The object 402 can include a first layer 404 including a first polymeric material, a second layer 406 including a second polymeric material, and a third layer 408 including the first polymeric material. The second polymeric material of the second layer 406 can include a magnetic material that can be magnetized by the apparatus 400. In some cases, the particles of the magnetic material may be unaligned before a magnetic field is applied to the second layer 406 of the object 404. Additionally, although the illustrative example of FIG. 4 shows that the object 402 includes two layers of the first polymeric material and one layer of the second polymeric material, the object 402 can have at least one layer of the first polymeric material and at least one layer of the second polymeric material. In a particular implementation, the first layer 404, the second layer 406, and the third layer 408 can be formed by extruding the first polymeric material and the second polymeric material onto a platform or other substrate.

A magnetic field can be generated by a first magnetizing device 410 and/or a second magnetizing device 412. In an implementation, a magnetic field can be generated by directing current through a first coil 414 of the first magnetizing device 410 and/or directing current through a second coil 416 of the second magnetizing device 412. The apparatus 400 can also include a first magnetic plate 418 and a second magnetic plate 420. When a magnetic field is generated by the first magnetizing device 410 and/or the second magnetizing device 412, the first magnetic plate 418 can have a first polarity and the second magnetic plate 420 can have a second polarity that is opposite the first polarity. In the illustrative implementation of FIG. 4, the magnetic field can be generated in a direction indicated by arrow 422. In this way, the magnetic particles of the second layer 406 can be aligned according to the direction of the magnetic field such that the second layer 406 includes a first portion 424 having the second polarity and a second portion 426 having the first polarity. Thus, the first portion 424 and the second magnetic plate 420 can have the same polarity and the second portion 426 and the first magnetic plate 418 can have the same polarity. Accordingly, when the first portion 424 is proximate to a portion of additional object including magnetic material having the second polarity, the first portion 424 and portion of the additional object can be repelled from each other. Also, when the first portion 424 is proximate to a portion of an additional object including magnetic material having the first polarity, the first portion 424 and the portion of the additional object can be attracted to each other.

Additionally, the apparatus 400 can have a first arm 428 and a second arm 430. The first arm 428 can be used to position the first magnetizing device 410 and the first magnetic plate 418 and the second arm 430 can be used to position the second magnetizing device 412 and the second magnetic plate 420 to apply a magnetic field to a portion of the object 402 that includes magnetic particles.

In a particular implementation, the first magnetic plate 418, the second magnetic plate 420, the first arm 428, and the second arm 430 can be made of high magnetic permeability materials such as a permalloy. Optionally, a magnetic yoke 436 can be added for connecting the first arm 428 and the second arm 430 to reinforce and stabilize a magnetic field generated by the apparatus 400. The magnetic yoke 436 can also be made of high magnetic permeability materials such as a permalloy, and can also be flexible.

The first magnetic device 410 and the first magnetic plate 418 can be moved along a first rail 432 to be proximate to the second layer 406. In addition, the second magnetic device 412 and the second magnetic plate 420 can be moved along a second rail 434 to be proximate to the second layer 406. In some cases, a length of the first arm 428 and a length of the second arm 430 can be controlled to move the first magnetic plate 418 and the second magnetic plate 420 within a specified distance of the second layer 406 to apply a magnetic field to the second layer 406 that is sufficiently strong to magnetize the magnetic particles of the second layer 406.

Although, the illustrative example of FIG. 4 shows the magnetic field being generated in the direction indicated by the arrow 422, the apparatus 400 can be used to generate a magnetic field in a direction opposite the direction indicated by the arrow 422. In these situations, the magnetic field can be generated from the first magnetic plate 418 to the second magnetic plate 420 with the first magnetic plate 418 having the second polarity and the second magnetic plate 420 having the first polarity. Also, in these situations, the portions of the second layer 406 can be arranged such that the first portion 424 has the first polarity and the second portion 426 has the second polarity. Furthermore, in some scenarios, the apparatus 400 can be configured to generate a magnetic field in a direction that is perpendicular to the direction indicated by the arrow 422. That is, the first magnetizing device 410, the second magnetizing device 412, the first magnetic plate 418, the second magnetic plate 420, the first arm 428, and the second arm 430 can be arranged to apply a magnetic field along the Z-axis. In this way, the particles of the magnetic material included in the second layer 406 can be aligned in a different manner. In one illustrative example, a first portion of the second layer 406 having particles of a first polarity can be disposed in a direction along the X-axis and adjacent to the first layer 404 and a second portion of the second layer 406 having particles of a second polarity can be disposed in a direction along the X-axis and adjacent to the third layer 408. In another illustrative example, a first portion of the second layer 406 having particles of a first polarity can be disposed in a direction along the X-axis and adjacent to the third layer 408 and a second portion of the second layer 406 having particles of a second polarity can be disposed in a direction along the X-axis and adjacent to the first layer 404. Additionally, although the illustrative implementation of FIG. 4 includes multiple magnetizing devices, in other implementations, the apparatus 400 can include a single magnetizing device that has a coil that is coupled to the first magnetic plate 418 and the second magnetic plate 420.

Figure 5:
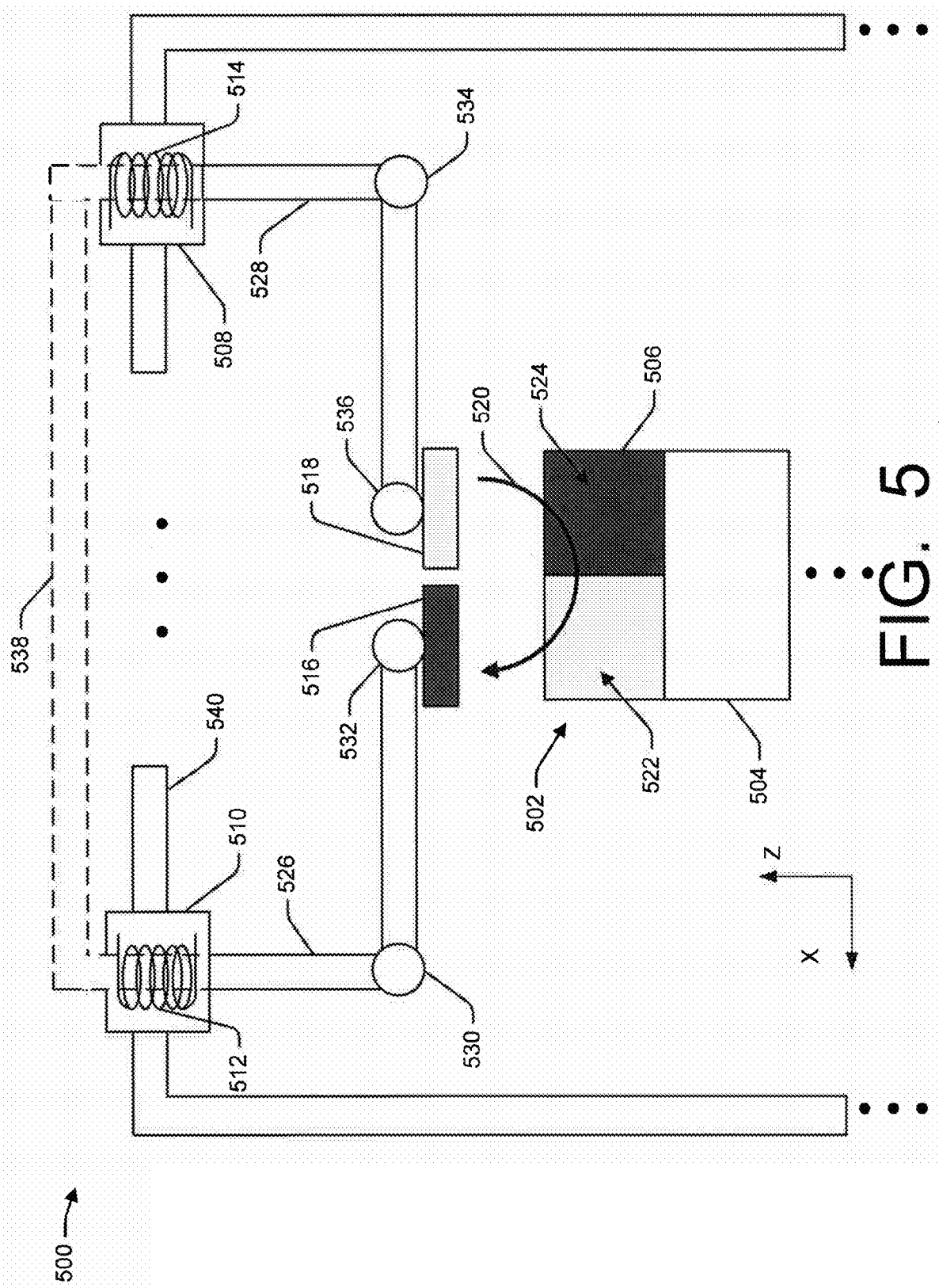
FIG. 5 illustrates a second example apparatus to magnetize magnetic material included in a layer of an object by applying a magnetic field to the magnetic material.

FIG. 5 illustrates a second example apparatus 500 to magnetize magnetic material included in a layer of an object 502 by applying a magnetic field to the magnetic material. The object 502 can include a first layer 504 including a first polymeric material and a second layer 506 including a second polymeric material. The second polymeric material of the second layer 506 can include a magnetic material that can be magnetized by the apparatus 500. In some cases, the particles of the magnetic material may be unaligned before a magnetic field is applied to the second layer 506 of the object 504. Additionally, although the illustrative example of FIG. 5 shows that the object 502 includes one layer of the first polymeric material and one layer of the second polymeric material, the object 502 can have at least one layer of the first polymeric material and at least one layer of the second polymeric material. In a particular implementation, the first layer 504 and the second layer 506 can be formed by extruding the first polymeric material and the second polymeric material onto a platform or another substrate.

A magnetic field can be generated by a first magnetizing device 508 and/or a second magnetizing device 510. In an implementation, a magnetic field can be generated by directing current through a first coil 512 of the first magnetizing device 508 and/or directing current through a second coil 514 of the second magnetizing device 510. The apparatus 500 can also include a first magnetic plate 516 and a second magnetic plate 518. When a magnetic field is generated by the first magnetizing device 508 and/or the second magnetizing device 510, the first magnetic plate 516 can have a first polarity and the second magnetic plate 518 can have a second polarity that is opposite the first polarity. In the illustrative implementation of FIG. 5, the magnetic field can be generated in a direction indicated by arrow 520. In this way, the magnetic particles of the second layer 506 can be aligned according to the direction of the magnetic field such that the second layer 506 includes a first portion 522 having the second polarity and a second portion 524 having the first polarity. Thus, the first portion 522 and the second magnetic plate 518 can have the same polarity and the second portion 524 and the first magnetic plate 516 can have the same polarity. Accordingly, when the first portion 522 is proximate to a portion of an additional object including magnetic material having the second polarity, the first portion 522 and portion of the additional object can be repelled from each other. Also, when the first portion 522 is proximate to a portion of an additional object including magnetic material having the first polarity, the first portion 522 and the portion of the additional object can be attracted to each other Additionally, the apparatus 500 can have a first arm 526 and a second arm 528. The first arm 526 can include a first elbow 530 and a second elbow 532. Also, the second arm 528 can include a third elbow 534 and a fourth elbow 536. The first arm 526, the first elbow 530, and the second elbow 532 can be used to position the first magnetizing device 508 and the first magnetic plate 516 and the second arm 528, the third elbow 534, and the fourth elbow 536 can be used to position the second magnetizing device 510 and the second magnetic plate 518 to apply a magnetic field to a portion of the object 502 that includes magnetic particles.

In a particular implementation, the first magnetic plate 516, the second magnetic plate 518, the first arm 526, the second arm 528, the first elbow 530, the second elbow 532, the third elbow 534, and the fourth elbow 536 can be made of high magnetic permeability materials such as a permalloy. Optionally, a magnetic yoke 538 can be added for connecting the first arm 526 and the second arm 528 to reinforce and stabilize a magnetic field generated by the apparatus 500. The magnetic yoke 538 can also be made of high magnetic permeability materials such as a permalloy, and can be flexible.

The first magnetic device 508 and the second magnetic device 510 can be moved along a rail 540 to be proximate to portions of the second layer 506. In some cases, a length of the first arm 526, a rotation of the first elbow 530, and/or a rotation of the second elbow 532 and a length of the second arm 528, a rotation of the third elbow 534, and/or a rotation of the fourth elbow 536 can be controlled to move the first magnetic plate 516 and the second magnetic plate 518 within a specified distance of the second layer 506 to apply a magnetic field to the second layer 506 that is sufficiently strong to magnetize the magnetic particles of the second layer 506. Additionally, although the illustrative implementation of FIG. 5 includes multiple magnetizing devices, in other implementations, the apparatus 500 can include a single magnetizing device that has a coil that is coupled to the first magnetic plate 516 and the second magnetic plate 518.

Although, the illustrative example of FIG. 5 shows the magnetic field being generated in the direction indicated by the arrow 522, the apparatus 500 can be used to generate a magnetic field in a direction opposite the direction indicated by the arrow 522. In these situations, the magnetic field can be generated from the first magnetic plate 516 to the second magnetic plate 518 with the first magnetic plate 516 having the second polarity and the second magnetic plate 518 having the first polarity. Also, in these situations, the portions of the second layer 506 can be arranged such that the first portion 522 has the first polarity and the second portion 524 has the second polarity.

Figure 6:
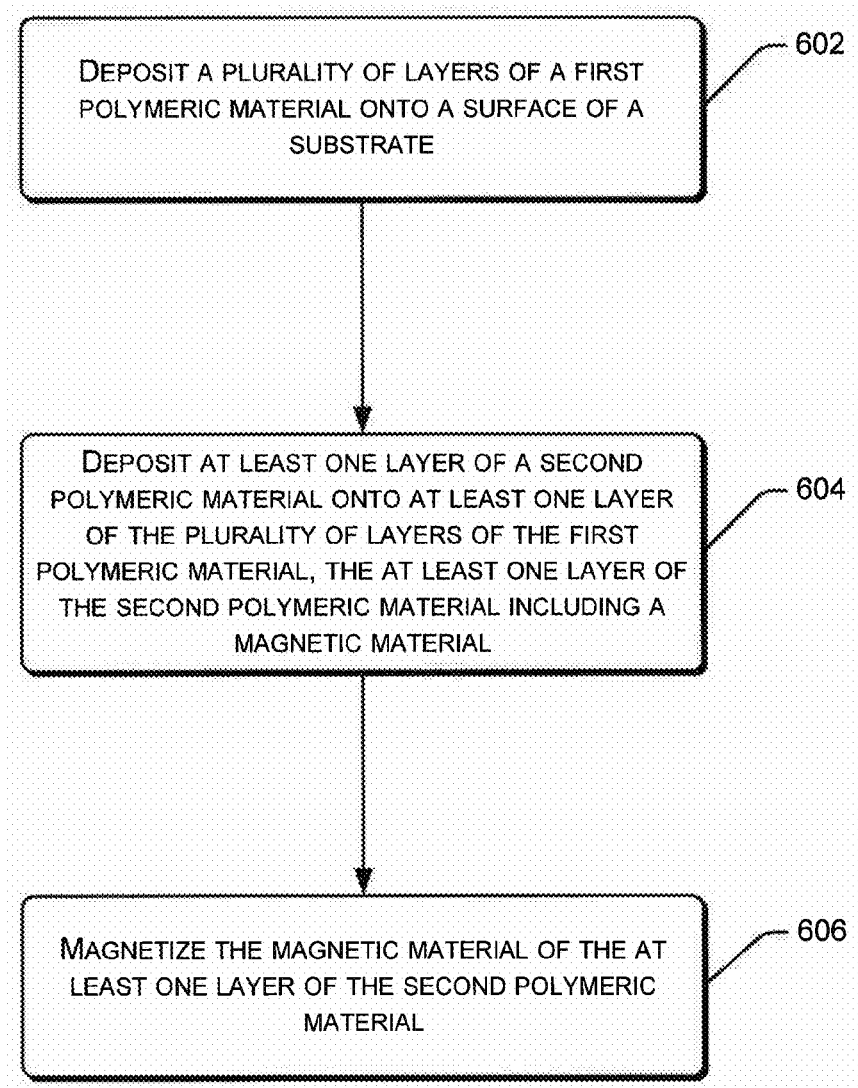
FIG. 6 illustrates an example process to form objects including one or more layers of a polymeric material that include a magnetic material.

In the flow diagram of FIG. 6, each block represents one or more operations. In some cases, at least a portion of the one or more operations of each block can be performed by an apparatus according to computer-executable instructions processed by a control system of the apparatus. In other cases, at least a portion of the one or more operations of each block can be performed manually. The order in which the blocks are described is not intended to be construed as a limitation, and any number of the described operations can be combined in any order and/or in parallel to implement the processes.

FIG. 6 illustrates an example process 600 to form objects including one or more layers of a polymeric material that include a magnetic material. At 602, the process 600 can include depositing a plurality of layers of a first polymeric material onto a surface of a substrate. In some cases, the plurality of layers of the first polymeric material can be extruded onto the substrate. Additionally, the first polymeric material can be free of magnetic materials. In an implementation, a layer of the plurality of layers of the first polymeric material has a thickness of no greater than about 100 micrometers.

At 604, the process 600 can include depositing at least one layer of a second polymeric material onto at least one layer of the plurality of layers of the first polymeric material. The at least one layer of the second polymeric material can include a magnetic material. In an implementation, the magnetic material can include neodymium particles having a particle size less than 100 micrometers. Also, the at least one layer of the second polymeric material can have a thickness of no greater than about 100 micrometers. Furthermore, at least one of the first polymeric material and the second polymeric material can include an acrylonitirile-butadiene-styrene co-polymer In a particular implementation, a first extrusion process can be used to deposit the plurality of layers of the first polymeric material onto the surface of the substrate and a second extrusion process can be used to deposit the at least one layer of the second polymeric material onto the at least one layer of the plurality of layers of the first polymeric material. In some cases, the first extrusion process and the second extrusion process can have different conditions. For example, the first extrusion process can include applying a temperature included in a range of about 210° C. to about 270° C. to the first polymeric material and the second extrusion process can include applying a temperature included in a range of about 180° C. to about 250° C. to the second polymeric material.

At 606, the process 600 can include magnetizing the magnetic material of the at least one layer of the second polymeric material. In an implementation, a magnetic field can be applied to the magnetic material of the at least one layer of the second polymeric material to magnetize the magnetic material. In an example, one or more magnetizing devices can be moved to be disposed proximate to the magnetic material. A magnetic field can then be generated by directing current through a respective coil of at least one magnetizing device to magnetize the magnetic material. In some cases, the magnetic field can be generated by the apparatus used to deposit the magnetic material onto the substrate. In other cases, a device separate from the apparatus used to deposit the magnetic material onto the substrate can magnetize the magnetic material.

In an implementation, the at least one magnetizing device can include a first magnetizing device having a first coil and a second magnetizing device including a second coil. In these implementations, the magnetic material of the at least one layer of the second polymeric material can be magnetized by directing current through the first coil, directing current through the second coil, or directing current through the first coil and the second coil. Additionally, the first magnetizing device can be coupled to a first arm and the second magnetizing device can be coupled to a second arm. Furthermore, the first magnetizing device and the second magnetizing device can be coupled to a single rail in some implementations, or to separate rails in other implementations. Magnetizing magnetic material of a layer of the object can include moving the first magnetizing device and/or the second magnetizing device along at least one rail to a location that is proximate to the magnetic material included in a layer of the object. Also, the first arm and the second arm can be moved to respective locations such that enable magnetic plates of the magnetizing devices can apply a magnetic field to portions of a layer of the object that include magnetic material.

In an implementation, the magnetic material can be magnetized such that a first portion of particles of the magnetic material are arranged in a first direction and have a first polarity. Additionally, the magnetic material can also be magnetized such that a second portion of particles of the magnetic material are arranged in a second direction and have a second polarity. The second direction can be opposite the first direction and the second polarity can be opposite the first polarity. In an illustrative example, the first portion of the particles of the magnetic material can have a north pole, while the second portion of the particles of the magnetic material can have a south pole. In a particular implementation, the first plurality of particles and the second plurality of particles can be arranged such that the first plurality of particles are disposed adjacent to the second plurality of particles in a direction substantially perpendicular to the surface of the substrate. In another implementation, the first plurality of particles and the second plurality of particles can be arranged such that the first plurality of particles are disposed adjacent to the second plurality of particles in a direction substantially parallel to the surface of the substrate.

Example Clauses

A. A method comprising: disposing a plurality of layers of a first polymeric material onto a surface of a substrate; disposing at least one layer of a second polymeric material onto at least one layer of the plurality of layers of the first polymeric material, the at least one layer of the second polymeric material including a magnetic material.

B. The method of clause A, wherein: the plurality of layers of the first polymeric material are deposited onto the substrate using a first extrusion process; and the at least one layer of the second polymeric material is deposited onto the at least one layer of the plurality of layers of the first polymeric material using a second extrusion process.

C. The method of clause B, wherein: the first extrusion process includes applying a temperature included in a range of about 210° C. to about 270° C. to the first polymeric material; and the second extrusion process includes applying a temperature included in a range of about 180° C. to about 250° C. to the second polymeric material.

D. The method of any one of clauses A-C, further comprising magnetizing the magnetic material of the at least one layer of the second polymeric material.

E. The method of clause D, wherein: the magnetic material includes a first plurality of particles having a first polarity and a second plurality of particles having a second polarity; and the method further comprises: arranging the first plurality of particles and the second plurality of particles such that the first plurality of particles are disposed adjacent to the second plurality of particles in a direction substantially perpendicular to the surface of the substrate.

F. The method of clause D, wherein: the magnetic material includes a first plurality of particles having a first polarity and a second plurality of particles having a second polarity; and the method further comprises: arranging the first plurality of particles and the second plurality of particles such that the first plurality of particles are disposed adjacent to the second plurality of particles in a direction substantially parallel to the surface of the substrate.

G. An apparatus comprising: a first material source for a first polymeric material; a second material source for a second polymeric material, the second polymeric material including a magnetic material; a first extrusion component to deposit a plurality of layers of the first polymeric material onto a surface of a substrate; and a second extrusion component to deposit at least one layer of the second polymeric material onto at least one layer of the plurality of layers of the first polymeric material.

H. The apparatus of clause G, further comprising at least one magnetizing device to magnetize the magnetic material of the at least one layer of the second polymeric material.

I. The apparatus of clause H, wherein the at least one magnetizing device includes a first magnetizing device having a first coil and a second magnetizing device including a second coil, and the magnetic material of the at least one layer of the second polymeric material is magnetized by directing current through the first coil, directing current through the second coil, or directing current through the first coil and the second coil.

J. The apparatus of clause I, further comprising: a first arm coupled to the first magnetizing device; and a second arm coupled to the second magnetizing device.

K. The apparatus of clause J, further comprising: at least one rail; and a control system including: one or more processors; and one or more computer storage media storing instructions executable by the one or more processors to perform operations comprising: moving the first arm to a first location and moving the second arm to a second location to magnetize the magnetic material of the at least one layer of the second polymeric material.

L. The apparatus of clause K, wherein the at least one rail includes a first rail and a second rail, and the operations moving the first arm along the first rail to the first location and the second arm along the second rail to the second location.

M. The apparatus of any one of clauses H-L, further comprising: a first rail, wherein the first extrusion component and the second extrusion component are mounted on the first rail; a second rail, wherein the first magnetizing component is mounted on the second rail; and a third rail, wherein the second magnetizing component is mounted on the third rail.

N. The apparatus of any one of clauses H-M, further comprising: a rail, wherein the first extrusion component, the second extrusion component, the first magnetizing component, and the second magnetizing component are mounted on the rail.

O. An article comprising: a plurality of layers of a first polymeric material; and at least one layer of a second polymeric material having a magnetic material, wherein the at least one layer of the second polymeric material is disposed on at least one layer of the first polymeric material.

P. The article of clause O, wherein the magnetic material includes neodymium particles having a particle size less than 100 micrometers.

Q. The article of clause P, wherein: a layer of the plurality of layers of the first polymeric material has a thickness of no greater than about 100 micrometers; and the at least one layer of the second polymeric material has a thickness of no greater than about 100 micrometers.

R. The article of clause Q, wherein at least one of the first polymeric material and the second polymeric material include an acrylonitirile-butadiene-styrene co-polymer.

S. The article of clause Q or R, wherein: the magnetic material includes a first plurality of particles having a first polarity and a second plurality of particles having a second polarity; and the first plurality of particles are disposed adjacent to the second plurality of particles in a direction substantially parallel to a horizontal plane of the object.

T. The article of any one of clauses Q, R, or S, wherein: the magnetic material includes a first plurality of particles having a first polarity and a second plurality of particles having a second polarity; the first plurality of particles are disposed adjacent to the second plurality of particles in a direction substantially perpendicular to a horizontal plane of the object.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, the subject matter defined in the appended claims is not limited to the specific features or acts described above. Rather, the specific features and acts described above are disclosed as example forms of implementing the claims.

This disclosure is intended to cover any and all adaptations or variations of the disclosed implementations, and the following claims should not be construed to be limited to the specific implementations disclosed in the specification.

The invention claimed is:

1. An article comprising:
a plurality of layers of a first polymeric material; and
at least one layer of a second polymeric material comprising a magnetic material, wherein the at least one layer of the second polymeric material is disposed on at least one layer of the first polymeric material, and wherein particles of the magnetic material in the at least one layer of the second polymeric material is magnetically aligned, after the disposition, by a pair of magnetic plates with opposing polarities.

2. The article of claim 1, wherein:
the magnetic material includes neodymium particles having a particle size less than 100 micrometers;
a layer of the plurality of layers of the first polymeric material has a thickness of no greater than about 100 micrometers; and
the at least one layer of the second polymeric material has a thickness of no greater than about 100 micrometers.

3. The article of claim 1, wherein:
the magnetic material includes a first plurality of particles having a first polarity and a second plurality of particles having a second polarity; and
the first plurality of particles are disposed adjacent to the second plurality of particles in a direction substantially parallel to a horizontal plane of the object.

4. The article of claim 1, wherein:
the magnetic material includes a first plurality of particles having a first polarity and a second plurality of particles having a second polarity; and
the first plurality of particles are disposed adjacent to the second plurality of particles in a direction substantially perpendicular to a horizontal plane of the object.

5. The article of claim 2, wherein:
the magnetic material includes a first plurality of particles having a first polarity and a second plurality of particles having a second polarity; and
the first plurality of particles are disposed adjacent to the second plurality of particles in a direction substantially parallel to a horizontal plane of the object.

6. The article of claim 2, wherein:
the magnetic material includes a first plurality of particles having a first polarity and a second plurality of particles having a second polarity; and
the first plurality of particles are disposed adjacent to the second plurality of particles in a direction substantially perpendicular to a horizontal plane of the object.

7. The article of claim 1, wherein:
the magnetic material comprises one or more of:
Neodymium;
Boron; and
Iron.

8. The article of claim 1, wherein:
the magnetic material is in a range between 1% by volume and 5% by volume of a total volume of the second polymeric material.

9. The article of claim 1, wherein:
the magnetic material is in a range between 2% by volume and 10% by volume of a total volume of the second polymeric material.

10. The article of claim 1, wherein:
the magnetic material is in a range between 8% by volume and 20% by volume of a total volume of the second polymeric material.

11. The article of claim 1, wherein:
the magnetic material is in a range between 15% by volume and 30% by volume of a total volume of the second polymeric material.

12. The article of claim 1, wherein:
the particles of the magnetic material comprise:
a first portion of the particles being arranged in a first direction having a first polarity; and
a second portion of the particles being arranged in a second direction having a second polarity, wherein the second direction is opposite to the first direction.

13. The article of claim 1, wherein:
the particles of the magnetic material comprise:
a first portion of the particles being arranged in a first direction having a first polarity; and
a second portion of the particles being arranged in a second direction having a second polarity, wherein the second polarity is a south pole and the first polarity is a north pole.

14. The article of claim 2, wherein:
the magnetic material comprises one or more of:
Neodymium;
Boron; and
Iron.

15. The article of claim 2, wherein:
the magnetic material is in a range between 1% by volume and 5% by volume of a total volume of the second polymeric material.

16. The article of claim 2, wherein:
the magnetic material is in a range between 2% by volume and 10% by volume of a total volume of the second polymeric material.

17. The article of claim 2, wherein:
the magnetic material is in a range between 8% by volume and 20% by volume of a total volume of the second polymeric material.

18. The article of claim 2, wherein:
the magnetic material is in a range between 15% by volume and 30% by volume of a total volume of the second polymeric material.

19. The article of claim 2, wherein:
the particles of the magnetic material comprise:
a first portion of the particles being arranged in a first direction having a first polarity; and
a second portion of the particles being arranged in a second direction having a second polarity, wherein the second direction is opposite to the first direction.

20. The article of claim 2, wherein:
the particles of the magnetic material comprise:
a first portion of the particles being arranged in a first direction having a first polarity; and
a second portion of the particles being arranged in a second direction having a second polarity, wherein the second polarity is a south pole and the first polarity is a north pole.

* * * * *